J. W. LARIMORE, OF CHICAGO, ILLINOIS.

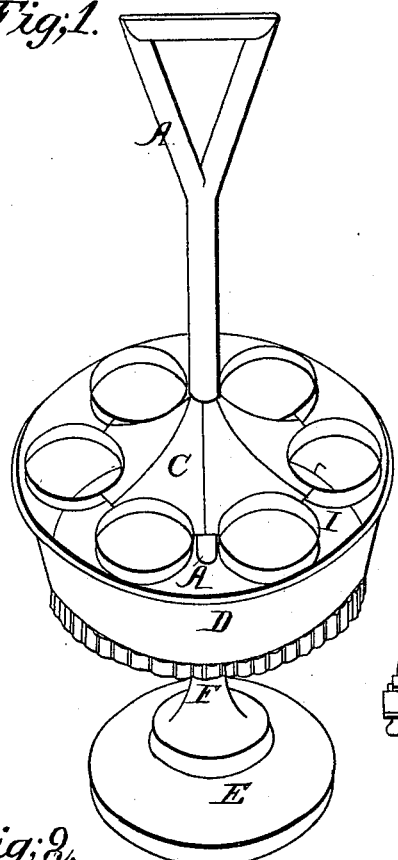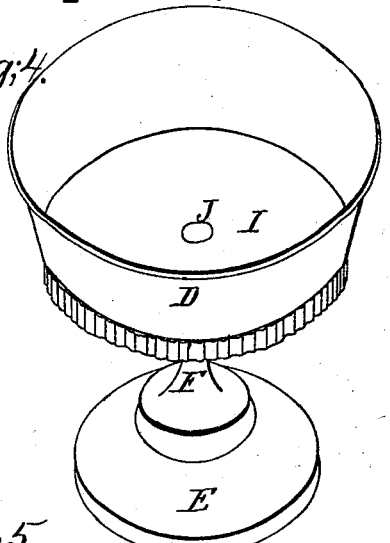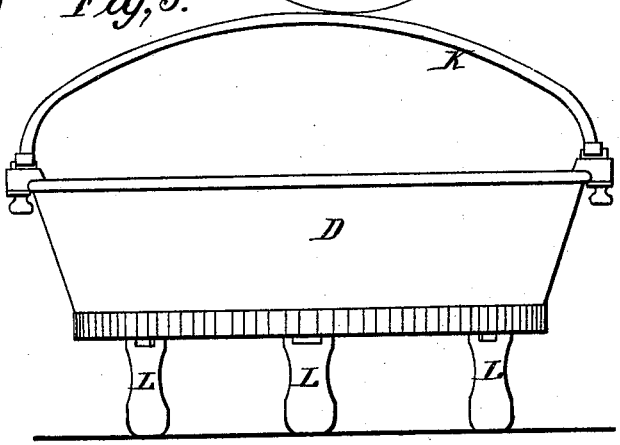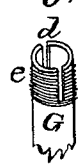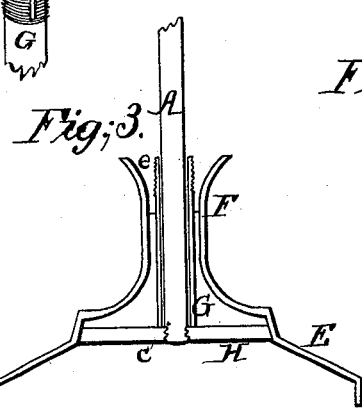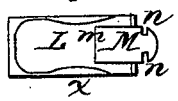

Letters Patent No. 87,054, dated February 16, 1869.

IMPROVED CASTER AND CAKE-BASKET.

The Schedule referred to in these Letters Patent and making part of the same.

*To all whom it may concern:*

Be it known that I, J. W. LARIMORE, of Chicago, in the county of Cook, and State of Illinois, have invented an Improved Caster, Fruit-Dish, and Cake-Basket; and I do hereby declare that the following is a full, clear, and exact description of the construction of the same, reference being had to the accompanying drawings, making a part of this description, in which—

Figure 1 is perspective representation of my invention, when arranged to be used as a caster.

Figure 2, a perspective representation of the hollow screw, which holds the pedestal of the caster in place, also the fruit-basket to the pedestal.

Figure 3, a sectional elevation of the pedestal and the stem of the caster-handle.

Figure 4, a perspective representation of the device used as a fruit-dish.

Figure 5, an elevation of the invention as a fruit or cake-basket.

Figure 6, a perspective representation of one of the hinged feet of the cake-basket, detached from the bottom.

Figure 7, a plan view of the same.

This invention relates to an improvement in tableware, the different parts being so arranged that they may be changed into three separate articles, viz, caster, fruit-dish, and cake-basket, each article appearing perfect in itself, this arrangement being desirable as a matter of economy, as the three articles are furnished at a small cost above the caster alone.

Fig. 1, drawing 1, represents my invention to be used as a caster, consisting, in separate parts, of a pedestal, E F, basin D, bottle-holder C, and handle A, all of which are made of silver, or other suitable material; and these parts are constructed in a peculiar manner, as hereinafter shown.

The pedestal E F is hollow, and has a nut, H, fixed in its base, in which the stem or lower end of the handle A is turned, as shown at fig. 3, drawing 1; and a cylinder, G, is secured to said nut, and it has a screw-thread on its upper end, which turns into the bottom of the basin D, and thus holds it in place; said cylinder having a slot in its top for receiving the prongs V V, of a stopper, J, shown in an inverted position at Figure 8, drawing 2.

The under side of the bottom of the basin D has three feet attached to it, as shown at 5, 6, and 7, drawing 2, fig. 6 being an inverted view in perspective.

The plates $x$ are secured by solder, or otherwise, to the bottom of the basin, and the feet L are hinged to them, and held in place by springs M, fastened to plates X, and passing through slots $m$, notches $n$ $n$ being made in the edges of the springs, and the parts between said notches locking into notches in the feet L, the springs M so operating as to hold the feet in a rigid position, as shown at fig. 5, drawing 2, when in use; and when not in use, hold them flat against the plates X, as shown at fig. 7, drawing 2, and thus keep them concealed when the basin D is used as a part of the caster or fruit-dish.

To change the caster, fig. 1, into a fruit-dish, fig. 4, drawing 2, unscrew the handle A from the nut H, in the base E, which will allow the handle A and bottle-holder C to be removed; then place the stopper J in the opening at the bottom of the basin D, from which the stem of the handle A is removed, to give the bottom of the basin a finished appearance, and the fruit-dish is perfect.

To change the fruit-dish, at fig. 4, drawing 2, into a cake-basket, fig. 5, drawing 2, unscrew the basin D from the top of the cylinder G, and remove it from the pedestal E F; then turn out the feet L into position as shown at fig. 5, and adjust the springs M, as shown at fig. 6, which operation will hold the feet firmly in place. A curved handle, K, is then attached to the rim of the basin, and the article is complete.

Having thus described my invention,

What I claim, and desire to secure by Letters Patent, is—

1. The adjustable feet L, in combination with the springs M and plates X, constructed and arranged substantially as and for the purpose set forth.

2. The adjustable feet L, in combination with the basin D, stopper J, and handle K, as and for the purpose herein specified.

3. The hollow pedestal E F, supporting a nut, H, and cylinder G, in combination with basin D and stopper J, constructed and arranged substantially as and for the purpose shown and described.

4. The combination of the pedestal E F, nut H, cylinder G, basin D, bottle-holder C, and handle A, as described and shown.

J. W. LARIMORE.

Witnesses:
GEO. L. CHAPIN,
A. HAYWARD.